United States Patent
Vukich et al.

(10) Patent No.: US 11,227,202 B2
(45) Date of Patent: Jan. 18, 2022

(54) TRANSACTION CARD FOR INDIVIDUALS WITH HEARING AND/OR VISION LOSS

(71) Applicant: Capital One Services, LLC, McLean, VA (US)

(72) Inventors: Adam Vukich, McLean, VA (US); James Zarakas, McLean, VA (US); Molly Johnson, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 17/108,582

(22) Filed: Dec. 1, 2020

(65) Prior Publication Data
US 2021/0216839 A1   Jul. 15, 2021

Related U.S. Application Data

(63) Continuation of application No. 16/738,625, filed on Jan. 9, 2020, now Pat. No. 10,878,302.

(51) Int. Cl.
*G06K 19/07* (2006.01)

(52) U.S. Cl.
CPC ......... *G06K 19/0716* (2013.01); *G06K 19/07* (2013.01)

(58) Field of Classification Search
CPC .......................... G06K 19/0716; G06K 19/07
See application file for complete search history.

(56) References Cited

U.S. PATENT DOCUMENTS 10,878,302 B1 * 12/2020 Vukich .................. G06K 19/07
2018/0095537 A1 * 4/2018 Dillon, Jr. ............. G06F 3/0346

* cited by examiner

*Primary Examiner* — Matthew Mikels
(74) *Attorney, Agent, or Firm* — Perkins Coie LLP

(57) ABSTRACT

A transaction card with an electronic feedback component is provided. The transaction card may comprise at least one processing device and a substrate component comprising a first substrate surface and a cavity formed in the substrate component. The transaction card my further comprise an electronic feedback component disposed at least partially within the cavity, the electronic feedback component being configured to receive an operation signal from the at least one processing device, the operation signal representing information associated with the transaction card based on an encoding scheme. The transaction card may further comprise a tactile element disposed at least partially within the cavity, the tactile element being actuated by the electronic feedback component based on the operation signal to convey the information to a user.

20 Claims, 7 Drawing Sheets

TRANSACTION CARD FOR INDIVIDUALS WITH HEARING AND/OR VISION LOSS

CROSS-REFERENCE TO RELATED APPLICATIONS

This application is a continuation of U.S. patent application Ser. No. 16/738,625, filed Jan. 9, 2020, the content of which is hereby incorporated by reference in its entirety.

BACKGROUND

The disclosed embodiments generally relate to a transaction card, and particularly, to a transaction card with an integrated tactile feedback component.

Transaction cards, such as credit and debit cards, have become a primary means for customers to conduct financial transactions. For example, credit cards are used at brick and mortar retail stores, in online transactions, and even between individuals (e.g., through mobile phone credit card readers, etc.). While transaction cards may be convenient for most users, they may present some difficulties for users who are deaf and/or blind. It may be difficult or even impossible for a deafblind individual to obtain information related to his or her account or a current transaction. This is especially true as card manufacturers are moving away from including raised print on the surface of transaction cards in favor of non-raised printed information. For example, a deafblind individual may wish to obtain the account number associated with a transaction card he or she is holding to verify the right card has been selected, or the like.

Some solutions include providing a vibrating element that may vibrate to indicate, for example, that the card has been successfully inserted into a card reader. Such solutions, however, are limited to short pulses indicating an event and would not be able to convey information such as an account number to a user. Further, vibration elements may draw significant power from the transaction card and may not be ideal for conveying longer strings of information.

Accordingly, in view of these and other deficiencies in existing techniques, technological solutions are needed for conveying information to a holder of a transaction card. For example, there is a need for solutions that advantageously allow the user to receive information pertaining to the transaction card, a transaction, or an account by touching a feedback component of the transaction card. Further, there is a need for the feedback component to be configured to move according to a predefined encoding scheme in order to efficiently convey the information. Additionally, there is a need for the feedback component to be configured to move such that minimal power draw from the transaction card is required.

SUMMARY

The disclosed embodiments relate to a transaction card with an integrated USB or other interface device.

In one embodiment, the transaction card may comprise at least one processing device; a substrate component comprising a first substrate surface and a cavity formed in the substrate component; an electronic feedback component disposed at least partially within the cavity, the electronic feedback component being configured to receive an operation signal from the at least one processing device, the operation signal representing information associated with the transaction card based on an encoding scheme; and a tactile element disposed at least partially within the cavity, the tactile element being actuated by the electronic feedback component based on the operation signal to convey the information to a user.

In another embodiment, the transaction card may comprise at least one processing device; a substrate component comprising a cavity; a tactile element disposed at least partially within the cavity and configured to be contacted by a user; and an electronic feedback component, the electronic feedback component being configured to: receive an operation signal from the at least one processing device; and actuate, based on the operation signal, the tactile element in a direction parallel to the first substrate surface.

It is to be understood that both the foregoing general description and the following detailed description are exemplary and explanatory only, and are not restrictive of the disclosed embodiments, as claimed.

BRIEF DESCRIPTION OF THE DRAWINGS

The accompanying drawings, which are incorporated in and constitute a part of this specification, illustrate disclosed embodiments and, together with the description, serve to explain the disclosed embodiments. In the drawings.

DETAILED DESCRIPTION OF THE EMBODIMENTS

Figure 1:
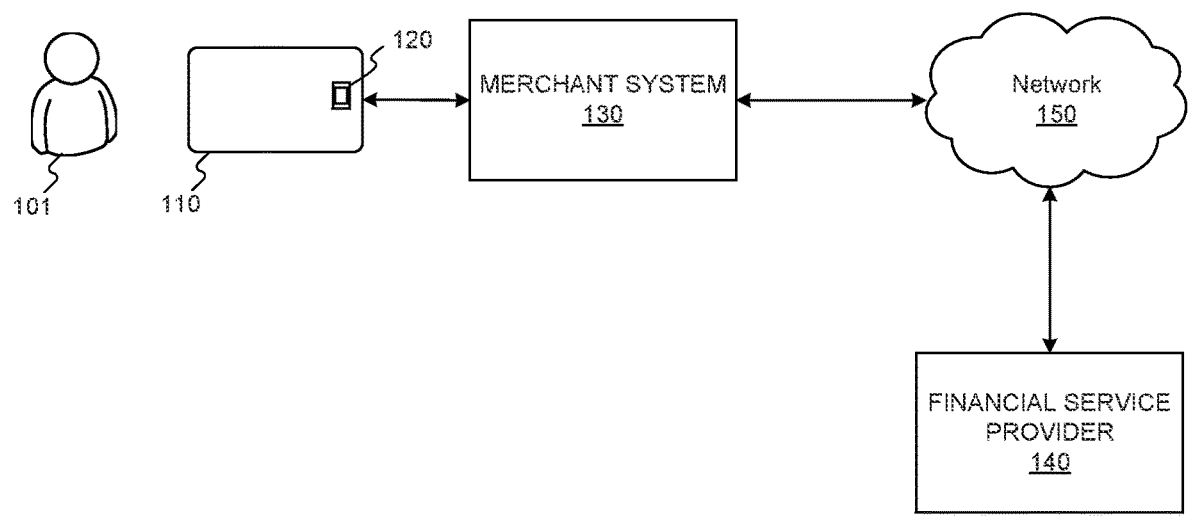
FIG. 1 is a block diagram of an exemplary transaction system for use with a transaction card consistent with the disclosed embodiments.

The present disclosure provides a transaction card with an integrated electronic feedback component for conveying information to a user. The electronic feedback component may include a tactile element configured to contact a finger or thumb of a user. The tactile element may move according to a predetermined encoding scheme (e.g., Morse code) to convey the information. Using such techniques may overcome several technological problems relating to security, efficiency, convenience, and functionality associated with use of the transaction card. For example, a deafblind individual may be able to access information, such as account information (e.g., account numbers, an account balance, etc.), transaction information (e.g., a transaction amount), or personal information from the transaction card itself. Using a moving tactile element may provide increased energy efficiency over a vibrating element, a display, a speaker, or other forms of feedback devices. Further, the information may be provided discretely to the cardholder, thereby enhancing security of the transaction card.

As used herein, "cardholder" may refer to an authorized user of a transaction card. For example, a cardholder may be a customer of a financial institution, such as a bank, a credit union, a credit card issuer, or other type of financial service entity that generates, provides, manages, and/or maintains financial service accounts for one or more customers. The cardholder may be associated with a financial service account, such as a credit card account, checking account, savings account, loan account, reward account, and any other type of financial service account known to those skilled in the art. The cardholder and/or financial service account may be associated with physical transaction cards, such as a credit or debit cards that a cardholder may carry on their person and be authorized to use to perform financial service transactions, for example, at a point of sale (POS) terminal, through an online transaction, at an automated teller machine (ATM), etc. In some embodiments, a cardholder may be a customer of a business entity, such as a retail establishment, restaurant, online retailer, etc., such that the customer is associated with an account with the business entity (e.g., an Amazon™ account, retail account, account associated with a gift card balance, etc.).

Additional aspects of the disclosed embodiments are set forth below in this disclosure. Reference will now be made in detail to exemplary embodiments, examples of which are illustrated in the accompanying drawings and disclosed herein. Wherever convenient, the same reference numbers will be used throughout the drawings to refer to the same or like parts. In the following description, certain aspects and embodiments of the present disclosure will become evident. It should be understood that the disclosure, in its broadest sense, could be practiced without having one or more features of these aspects and embodiments. It should also be understood that these aspects and embodiments are merely exemplary.

FIG. 1 is a block diagram of an example transaction system 100 for use with a transaction card consistent with the disclosed embodiments. Transaction system 100 may comprise a user 101, a transaction card 110, a merchant system 130, and a financial service provider system 140. The various components of environment 100 may be connected by a network 150. It should be understood, however, that transaction system 100 may include additional and/or alternative components.

Transaction card 110 may be any physical card product configured to store information, such as financial information (e.g., card numbers, account numbers, etc.), quasi-financial information (e.g., rewards balance, discount information, etc.), information pertaining to a transaction (e.g., transaction status, transaction amount, etc.) and/or individual-identifying information (e.g., name, address, etc.). Examples of transaction cards include, but are not limited to, credit cards, debit cards, gift cards, rewards cards, frequent flyer cards, merchant-specific cards, rewards cards, travel cards (e.g., a train pass, a bus pass, etc.), discount cards, insurance cards, identification cards, and driver's licenses. Accordingly, the term "transaction" should be construed broadly to include any presentation or transfer of information associated with the transaction card.

Merchant system 130 may be one or more computer systems associated with a merchant. For example, merchant system 130 may be associated with an entity that provides goods and/or services (e.g., a retail store). The merchant may include brick-and-mortar location(s) that a customer may physically visit and purchase goods and services. Such physical locations may include computing devices (e.g., merchant system 14) that perform financial service transactions with customers (e.g., POS terminal(s), kiosks, etc.). Additionally, or alternatively, merchant system 130 may be associated with a merchant who provides electronic shopping mechanisms, such as a website or a similar online location that consumers may access using a computer through browser software, a mobile application, or similar software. Merchant system 130 may include a client device, such as a laptop computer, desktop computer, smart phone, kiosk, or tablet that a customer may operate to access the electronic shopping mechanism.

Financial service provider system 140 may be one or more computer systems associated with an entity that provides financial services. For example, the entity may be a bank, credit union, credit card issuer, or other type of financial service entity that generates, provides, manages, and/or maintains financial service accounts for one or more customers. Financial service accounts may include, for example, credit card accounts, checking accounts, savings accounts, loan accounts, reward accounts, and any other types of financial service account. Financial service accounts may be associated with physical financial service transaction cards, such as a credit or debit cards that a user may carry on their person and use to perform financial service transactions, such as purchasing goods and/or services at a point of sale (POS) terminal. Financial service accounts may also be associated with electronic financial products and services, such as a digital wallet or similar account that may be used to perform electronic transactions, such as purchasing goods and/or services online.

Network 150 may be any type of network that facilitates communications and data transfer between components of transaction system 100, such as, for example, financial service provider system 140 and merchant system 130. Such communications may take place across various types of networks, such as the Internet, a wired Wide Area Network (WAN), a wired Local Area Network (LAN), a wireless WAN (e.g., WiMAX), a wireless LAN (e.g., IEEE 802.11, etc.), a mesh network, a mobile/cellular network, an enterprise or private data network, a storage area network, a virtual private network using a public network, a nearfield communications technique (e.g., Bluetooth™, Near Field Communication, infrared, etc.), or various other types of network communications. In some embodiments, the communications may take place across two or more of these forms of networks and protocols.

Transaction system 100 may be configured to conduct a transaction associated with the use of a transaction card 110. In one example, financial service provider system 140 may provide transaction card 110 to user 101 for use in conducting transactions associated with a financial service account held by user 101. In an example of one such transaction, user 101 may use transaction card 110 at a merchant location to make a purchase. During the course of the purchase, information may be transferred from transaction card 110 to merchant system 130 (e.g., through a point of sale device). Merchant system 130 may communicate with financial service provider system 140 via network 150 to complete the transaction. For example, merchant system 130 may receive account information from transaction card 110. Merchant system 130 may transmit the account information and a purchase amount, among other transaction information, to financial service provider system 140. Financial service provider system 140 may settle the transaction by transferring funds from the customer's financial service account to a financial service account associated with the merchant.

User 100 may be any individual using transaction card 110 that is in the physical presence of transaction card 110. For example, user 101 may be a cardholder associated with transaction card 110, as defined above. In some embodiments user 101 may conduct transactions using transaction card 110, for example at merchant system 130. In some embodiments, user 101 may be a deaf and/or blind individual. Accordingly, user 101 may have difficulty perceiving personal information or information associated with transaction card 110. For example, user 101 may not be able to read or otherwise interpret information printed on transaction card 110. Further, user 101 may not be able to receive audible or visual feedback from other components of system 100. For example, user 101 may not be able to read information displayed on a device of merchant system 130 or may not be able to receive audio feedback from the device or from another individual (e.g., an employee of the merchant, etc.). While the current embodiments may be particularly useful for individuals that are deaf or blind, it is understood that the present disclosure is not limited to any particular classification or condition of user 101.

Transaction card 110 may include an electronic feedback component 111 which may be configured to provide information associated with transaction card 110 to user 101. For example, user 101 may place a finger or thumb in contact with electronic feedback component 111, which may move in order to convey information to user 101. Electronic feedback component 120 and the means for providing information to user 101 are described in greater detail below.

Figure 2A:
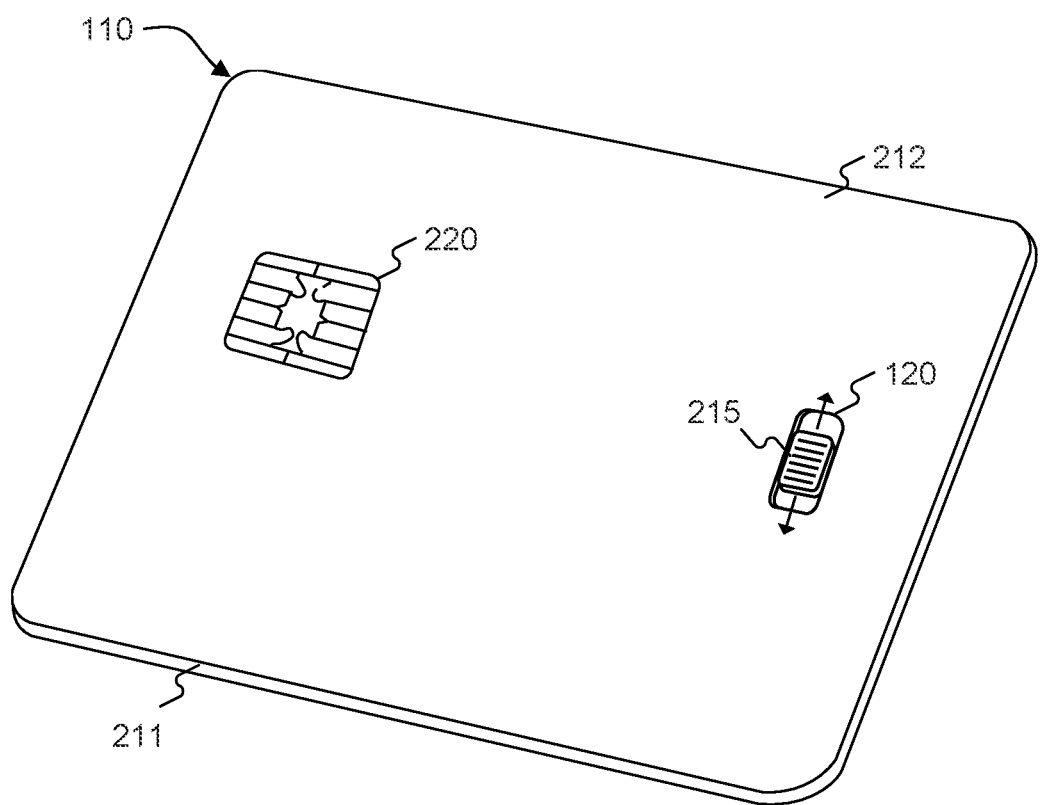
FIG. 2A illustrates an exemplary transaction card with an integrated electronic feedback component consistent with the disclosed embodiments.

FIG. 2A illustrates an example transaction card 110 with an integrated electronic feedback component 120 consistent with the disclosed embodiments. Transaction card 110 may comprise a substrate 211 having a front substrate surface 212. Electronic feedback component 120, which may be disposed along front substrate surface 212, may be any device configured to providing tactile feedback to a user. Transaction card 110 may include various other components, such as smartcard chip 220, which is described in greater detail below.

Electronic feedback component 120 may be any device or component configured to move to convey information to a user. As discussed above, user 101 (which may be a cardholder of transaction card 110) may receive information associated with user 101 and/or transaction card 110 through electronic feedback component 120. Such information may be accessed in relation to a specific transaction being performed (e.g., with merchant system 130) or may be accessed in the absence of a particular transaction (e.g., while user 101 is at home etc.). Electronic feedback component 120 may include a tactile element 215, which may be configured to move in relation to transaction card 110. User 101 may place a finger, thumb or other body part in contact with electronic device 210, and in particular with tactile element 215. Transaction card 110 may be configured to actuate electronic feedback component 120 such that tactile element 215 moves to convey information to user 101.

Transaction card 110 may be configured to move according to a particular encoding scheme in order to convey the information to user 101. The encoding scheme may be any predefined code, language, or format for representing information based on movement of tactile element 215. In some embodiments, the information may be a series of alphanumeric characters and the encoding scheme may associate each character with a predefined pattern or sequence. In one example, the encoding scheme may comprise Morse code. Accordingly, each character may be represented as a series of signals having one of two different signal durations (e.g., "dashes" and "dots"). Electronic feedback component 120 can convey the dashes and dots in various ways. For example, electronic feedback component 120 may be configured to move tactile element 215 back and forth between two different positions (e.g., as represented by the arrows shown in FIG. 2A). Tactile element 215 may originate in a first position and movement to the second position may represent either a dash or a dot based on how quickly tactile element 215 reaches the second position, and vice versa. In other embodiments, moving away from the first position and returning to the first position may represent one signal. In such embodiments each signal (e.g., a "dot" or a "dash") may correspond to the duration tactile element 215 is in the second position. For example, tactile element 215 may pause in the second position longer to represent a dash. In other embodiments, each signal may correspond to a distance traveled by tactile element 215. For example, a dot may be represented by tactile element 215 moving halfway to the second position and then back to the first position, whereas a dash is represented by moving completely to the second position and back to the first position. Various other means for representing different signals may also be used, such as the length of a vibration, the direction of movement of the tactile element, etc.

While Morse code is provided by way of example, above, it is understood that various other encoding schemes may be used. For example, the encoding scheme may be an equivalent to Morse code that has been developed for other languages, such as languages not based on Roman characters. For example, the encoding scheme may include Russian Morse code, Wabun code, Chinese telegraph code, Standard Korean Alphabet Transliteration System (SKATS), etc. In some embodiments, the encoding scheme may be an alternative to Morse code, such as a grid-based encoding system (e.g., 5×5 tap code, etc.), or any other form of code. In some embodiments, the code may be a proprietary code, such as a code that is provided by merchant system 130 and/or financial service provider system 140.

The information conveyed using electronic feedback component 120 may be any information associated with user 101 and/or transaction card 110. In some embodiments, the information may include personal information of user 101. For example, the information may include an account holder's name (which may be a name of user 101), a birthdate, an occupation or position held by user 101, a company or organization associated with user 101 (workplace, etc.), a height, an eye color, a sex, an address, or the like. In some embodiments, the information may comprise information associated with an account associated with transaction card 110 or user 101 (e.g., an account held by user 101 with financial service provider 140). Accordingly, the information may comprise at least one of an account number (e.g., a PAN (primary account number), a rewards account number, a frequent flyer number, etc.), a balance associated with the account (e.g., a remaining balance of funds, a current balance of charges, etc.), a cardholder name, a bill amount, a bill due date, a previous payment date, an amount previously paid, a previous transaction amount, a previous transaction type, an expiration date of the transaction card or of the account, or the like. In some embodiments, the information may be specific to merchant system 130. For example, transaction card 110 may be a loyalty or rewards card and the account information may indicate free items or other perks available for redemption by user 101, a rewards tier or status (e.g., blue, gold, platinum, etc.), an account balance, or the like. The information may also comprise the name of the merchant, a location of the merchant, the name of an individual associated with the merchant, or any other information that may be presented to user 101 in relation to transaction card 110.

In some embodiments, the information may comprise information associated with a transaction. For example, user 101 may use transaction card 110 at a merchant system 130 to conduct a transaction, and electronic feedback component 120 may convey information about the transaction to user 101. Accordingly, in some embodiments, the information may comprise a transaction amount, descriptions of items or services being purchased, an account balance prior to the transaction, a remaining balance after the transaction, an account number from which the transaction will be deducted, or various other information specific to the transaction. In some embodiments, the information may instructions or status indicators associated with the transaction. For example, information may include a status of the transaction (e.g., "transaction complete," "transaction failed," etc.), a request or instruction directed towards user 101 (e.g., "Amount OK?," "Please remove card," "Please reinsert card," etc.), or other similar information. While various examples are provided above, it is understood that the present disclosure is not limited to any particular information that may be provided to a user of transaction card 110.

Electronic feedback component 120 may be configured in various positions and/or orientations with respect to transaction card 110. For example, as shown in FIG. 1, electronic feedback component 120 may be placed on a front of transaction card 110 (e.g., along front substrate surface 212). In this embodiment, user 101 may place his or her thumb on electronic feedback component 120 while transaction card 110 is being used for a transaction. For example, transaction card 110 may be inserted into a chip reader for conducting a transaction using smartcard chip 220. Accordingly, user 110 may maintain contact with electronic feedback component 120 throughout the duration of the transaction. This may also be true for other transactions, such as swiping transaction card 110, presenting information displayed on a front or rear surface of transaction card 110 (e.g., typed personal identification information, a photograph, etc.), scanning a code displayed on a surface of transaction card 110 (e.g., a barcode, a QR code, etc.) or various other forms of transactions. In some embodiments, electronic feedback component 120 may be placed on a rear surface of transaction card 110, on an edge of transaction card 110, or in various other locations accessible by user 101.

In some embodiments, tactile element may move back and forth to convey the information to user 101. For example, as described above, tactile element 215 may move back and forth as indicated by the arrows shown in FIG. 2A. Accordingly, tactile element 215 may be configured to move bidirectionally along an axis parallel to front substrate surface 212. For example, tactile element 215 may move back and forth along a width of transaction card 110, as shown. In other embodiments, tactile element 215 may move in various other directions, for example, along a length of transaction card 110, or at an angled direction. In other embodiments, tactile element may be configured to move in a direction perpendicular to front card surface 212. For example, tactile element 215 may be configured to move bidirectionally between a position where tactile element 215 is recessed within front card surface 212 of transaction card 110 and position where tactile element protrudes from front substrate surface 212. In some embodiments, tactile element 215 may also be flush with front substrate surface 212 in either the first or second position.

The physical properties of transaction card 110 (e.g., size, flexibility, location of various components included in the card) may meet various international standards, including, for example, ISO/IEC 7810, ISO/IEC 7811, ISO/IEC 7812, ISO/IEC 7813, ISO/IEC 7816, ISO 8583, ISO/IEC 4909, and ISO/IEC 14443. For example, transaction card 110 may have a width of approximately 85.60 mm, a height of approximately 53.98 mm, and a thickness of approximately 0.76 mm, as specified in ISO/IEC 7810. In some embodiments, transaction card 110 may be thicker as to accommodate various features of transaction card 110, such as electronic feedback component 120. For example, transaction card 110 may include one or more raised surfaces, bumps, or the like to accommodate electronic feedback component 120. In other embodiments, transaction card 110 may have a substrate 211 with a uniform thickness. It would be apparent to one of skill in the art that other dimensions and layouts of card components of transaction card 110 are possible as well.

Substrate 211 may be constructed of various materials suitable for a transaction card. For example, transaction card 110 may be manufactured out of plastic such as polycarbonate (PC) or polyvinyl chloride (PVC). Various other materials may also be used, including soft touch plastic, metal (e.g., aluminum, etc.), fiber composite materials, resin, etc. In some embodiments, transaction card 110 may include additional material features, such as coverings (e.g., a silicone overmold), veneers (e.g., a wooden veneer), finishes (e.g. an oil-slick aluminum finish), or the like. In some embodiments, a covering may be placed over electronic feedback component 120 such that user 101 is not in direct contact with tactile element 215 but can feel its movement.

Substrate 211 may form the main body of transaction card 110. Substrate 211 may be formed of a single component or may be formed from multiple components. One or more electronic components may also be disposed within substrate 211, including, for example, a microchip, an EMV chip, an embedded NFC antenna, a Bluetooth™ device, a processor, a memory, a power supply, etc. Where substrate 211 is formed of multiple card substrates, the electronic component(s) may be disposed between the card substrates.

Figure 2B:
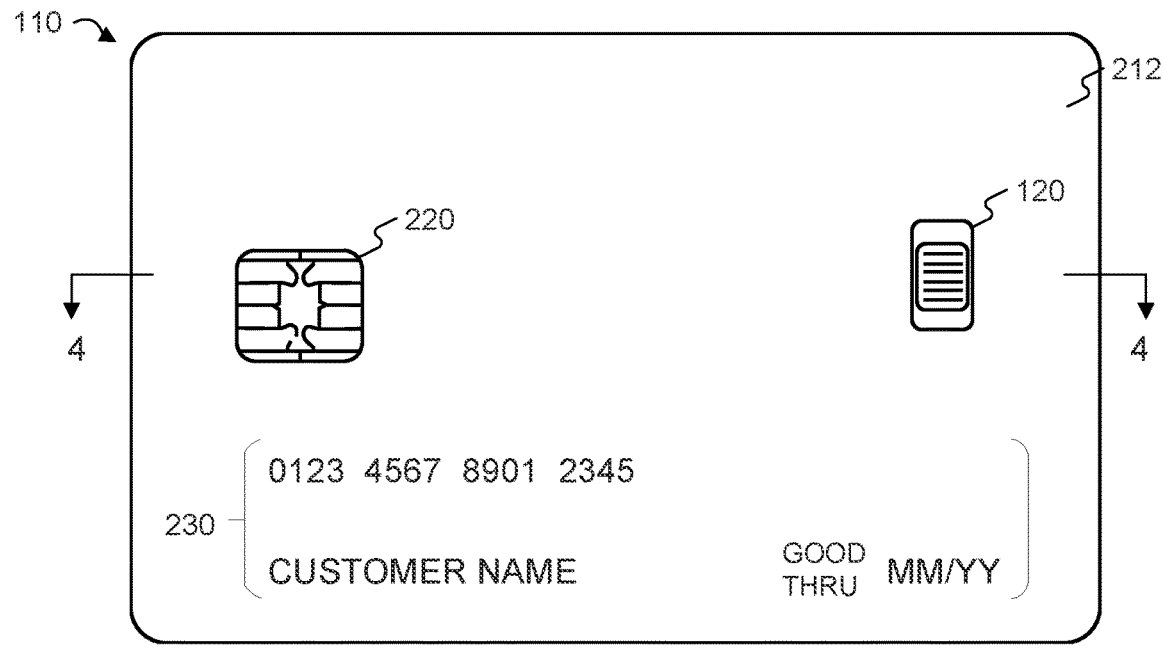
FIG. 2B shows a front view of a transaction card consistent with the disclosed embodiments.
Figure 2C:
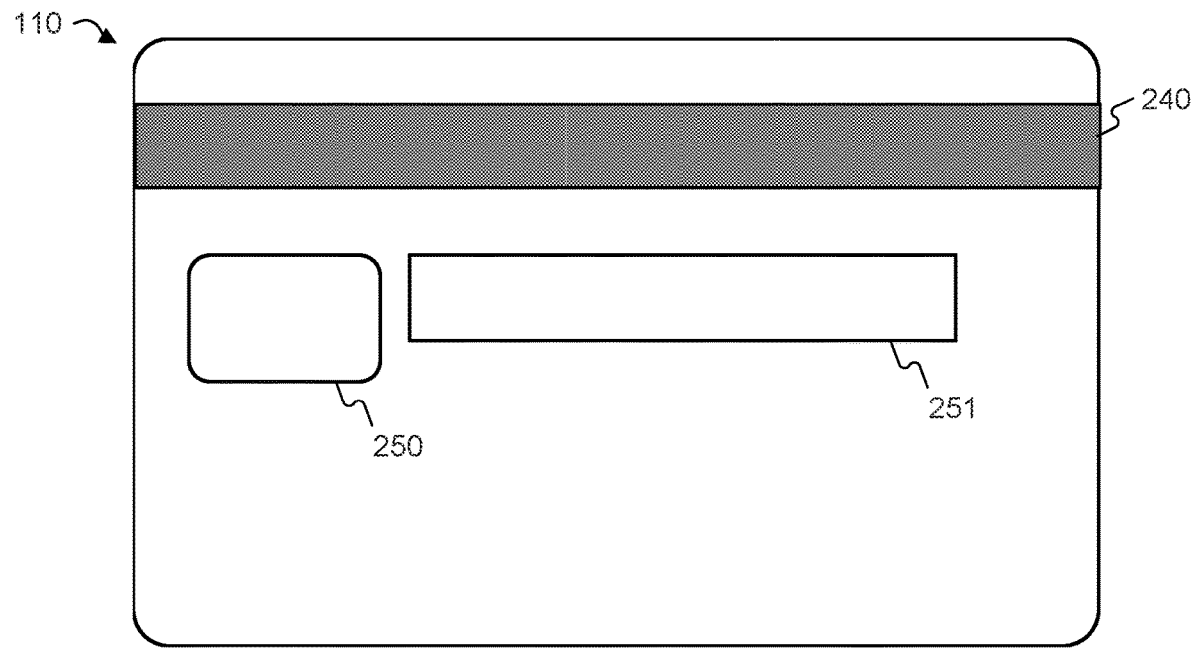
FIG. 2C shows a rear view of a transaction card consistent with the disclosed embodiments.

Transaction card 110 may comprise various other components, as shown in FIGS. 2B and 2C. FIG. 2B shows a front view of transaction card 110 consistent with the disclosed embodiments. As shown, front substrate surface 210 may include electronic feedback component 120 and smartcard chip 220. Smartcard chip 220 may be configured to make physical contact with a traditional smart card reader device and may be communicatively connected to a processor of transaction card 110 (e.g., processor 510, described below) to facilitate transactions or authentication protocols. For example, smartcard chip 220 may be used to make financial transactions through a card reader at a merchant device, a POS device, a chip reader, an ATM, etc. In some embodiments, front substrate surface may further include visible information 230. Visible information 230 may include, for example, personal information, such as information that is associated with a card, a user of the card, or information relating to an account associated with the card or card user. In some embodiments, visible information 230 may include "transaction information," such as financial information (e.g., card numbers, account numbers, expiration dates etc.), individual-identifying information (e.g., name, address, signature, etc.), bank information, and/or transaction network information, logos, designs, graphics, and/or other information. In some embodiments, visible information 230 may be substantially flush with front substrate surface 212 such that the information is not easily perceived through touch by user 101.

FIG. 2C shows a rear view of transaction card 110, opposite the side shown in FIG. 2B, consistent with the disclosed embodiments. Transaction card 110 may have one or more additional components to facilitate or improve the use of transaction card 110. For example, transaction card 110 may have a magnetic strip 240, a hologram 250, a signature block 251, an imprinted name and/or account number, an expiration date, a card verification value (CVV) code, a Quick Response (QR) code, or various other card features. In some embodiments, visible information 230 may be disposed on the rear side of transaction card 110.

Figure 3:
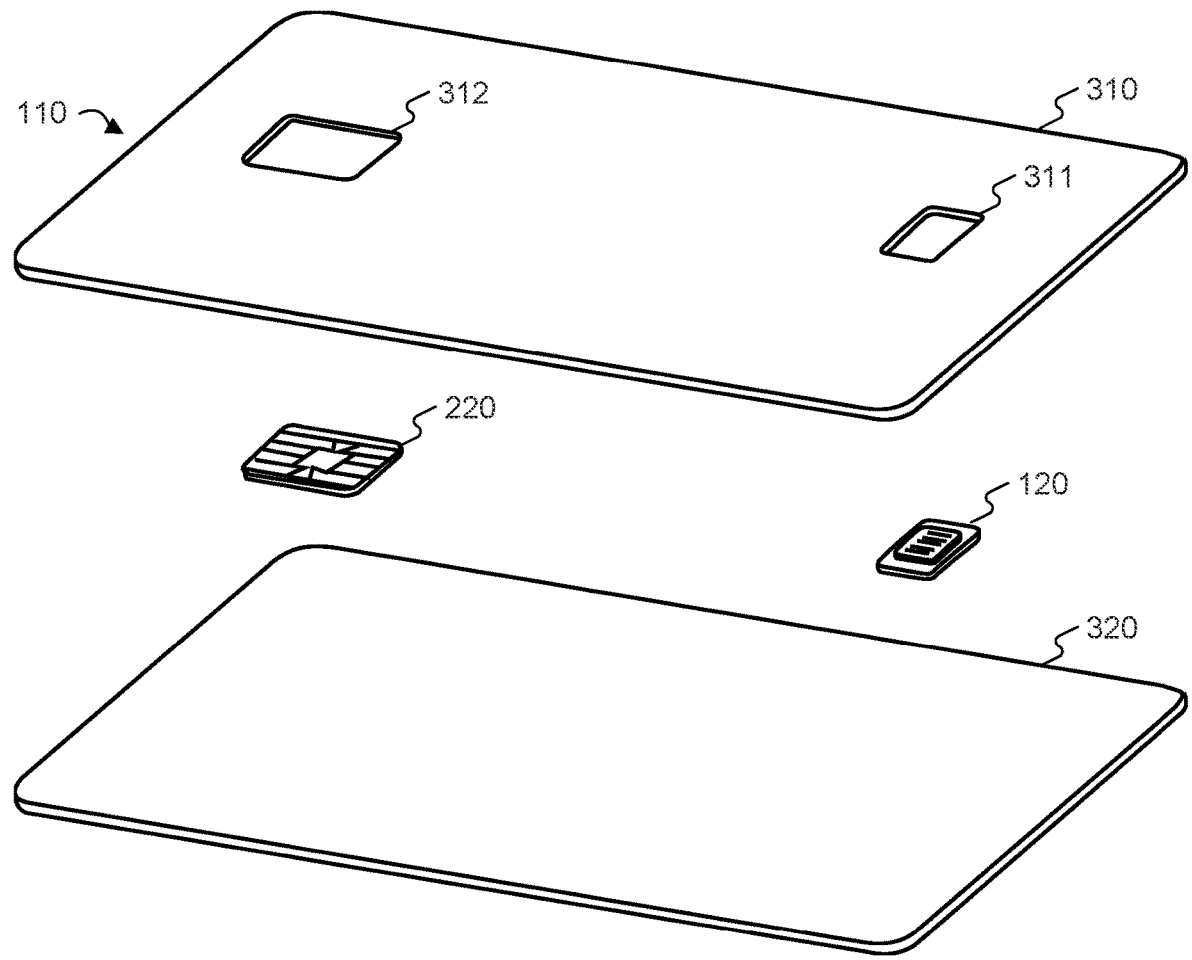
FIG. 3 is an exploded view of an exemplary transaction card comprising multiple substrate components consistent with the disclosed embodiments.

In some embodiments, as discussed above, transaction card 110 may be formed of multiple substrate components. FIG. 3 is an exploded view of an example transaction card 110 comprising multiple substrate components consistent with the disclosed embodiments. As shown in FIG. 3, substrate 211 may comprise multiple layers or card substrates joined together. For example, substrate 211 may be formed of a front card substrate 310 and a rear card substrate 320. The front card substrate and rear card substrate may be joined together in various ways. For example, in some embodiments transaction card 110 may be formed using an adhesive (e.g., a thermoplastic, polymer, or glue), which may be disposed between front card substrate 310 and rear card substrate 320. Front card substrate 310 and rear card substrate 320 may be joined in various other ways, including interconnecting features, fasteners, and/or any other types of joining techniques or mechanisms.

In embodiments where substrate 211 is formed of multiple layers or card substrates, each card substrate may be formed of the same material (such as the materials described above with respect to substrate 211). Alternatively, each substrate may be formed of a different material. For example, the rear card substrate may be formed of a plastic, such as polycarbonate (PC), whereas the front card substrate may be formed of a separate material, such as aluminum.

In some embodiments, front card substrate 310 may comprise one or more apertures for receiving various components of transaction card 110. For example, front card substrate 310 may comprise an aperture 312 for receiving smartcard chip 220 (or various other chips or electronic components) and aperture 311 for receiving electronic feedback component 120. In other embodiments, apertures 311 and 312 may also or alternatively be provided on or in rear card substrate 320. Apertures 311 and 312 may be formed using a laser-cutting process, stamping process, etching process, or another suitable process.

Smartcard chip 220 and/or electronic feedback component 120 may be disposed within apertures 312 and 311 in various ways. For example, smartcard chip 220 and electronic feedback component 120 may be joined either to front card substrate 310, rear card substrate 320, or both using an adhesive (e.g., a glue, an epoxy, a resin, etc.). In some embodiments, smartcard chip 220 and/or electronic feedback component 120 may be joined to rear card substrate 320 prior to joining front card substrate 310 and rear card substrate 320. In other embodiments, smartcard chip 220 and/or electronic feedback component 120 may be joined later. In some embodiments, at least a portion of electronic feedback component 120 may be disposed between front card substrate 310 and rear card substrate 320, such that not all of electronic feedback component 120 is exposed through aperture 311. In other embodiments, electronic feedback component 120 may be fully disposed within aperture 311.

Figure 4:
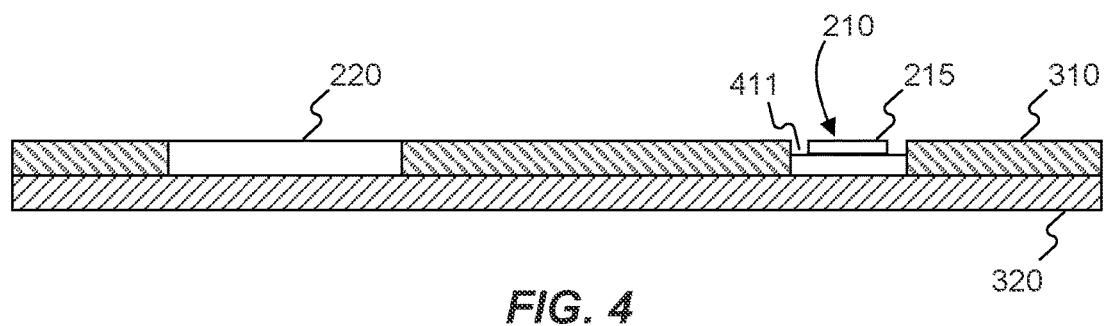
FIG. 4 is a cross section view of an exemplary transaction card consistent with the disclosed embodiments.

FIG. 4 is a cross section view of an example transaction card 110 consistent with the disclosed embodiments. The cross section view of transaction card 110 shown in FIG. 4 is in a plane as indicated by the cross section callout shown in FIG. 2B. As shown in FIG. 4, aperture 311 may partially define cavity 411. Cavity 411 may be a void space within card 110 or its components (e.g., within one or more of substrate 211, front card substrate 310, and/or rear card substrate 320). Cavity 411 may be configured to house or contain electronic feedback component 120. In embodiments where substrate 211 is formed of multiple substrate components, cavity 411 may extend through first card substrate 310, as defined by aperture 311, as shown in FIG. 4. In other embodiments cavity 411 may extend further, into rear card substrate 320. That is, cavity 411 may extend through front card substrate 310 and partially into rear card substrate 320.

As shown in FIG. 4, cavity 411 may be configured such that electronic feedback component 120 (in particular, tactile element 215) lies flush with front substrate surface 212. In other embodiments, tactile element 215 may be below front substrate surface 212 or may protrude above front substrate surface 212. In some embodiments, the tactile element comprises at least one of a ridge or a bump to provide grip, as described in further detail below.

Figure 5:
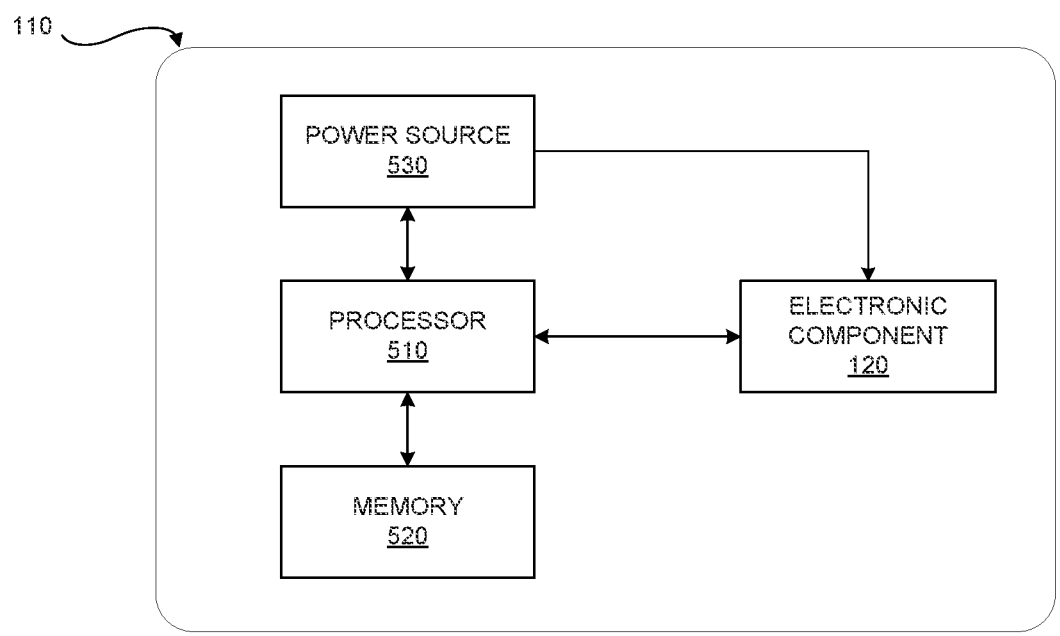
FIG. 5 is a block diagram of an exemplary transaction card with an integrated feedback component consistent with disclosed embodiments.

FIG. 5 is a block diagram of an example transaction card 110 with an integrated feedback device consistent with disclosed embodiments. Transaction card 110 may comprise electrical component 210, processor 510, memory 520, and a power source 530. Transaction card 110 may further comprise electrical connections between the various components. It should be appreciated, however, that transaction card 110 may include additional and/or alternative components than those shown in FIG. 5. It is understood that one or more of the described components may comprise multiple components or subcomponents. Further, it is understood that in some instances, one or more of the described components may be combined into a single component (e.g., a chip, module, etc.).

Processor (or processors) 510 may be any processing device configured to generate and transmit operation signals to electronic feedback component 120. Processor 510 may comprise a computer, a microprocessor, a processing unit, an integrated circuit, an application specific integrated circuit (ASIC), or the like. Processor 510 may be configured to run applications stored in memory 520 (e.g., as stored in instructions) for operating electronic feedback component 120. For example, processor 510 may generate an operation signal representing information associated with the transaction card based on an encoding scheme. The information may be any of the various forms of information described above. In some embodiments, processor 510 may access the information from memory 520. In other embodiments, processor may access the information from external components, such as through merchant system 130 (e.g., if the information pertains to a transaction, etc.). Processor 510 may run one or more modules, algorithms, applications or the like for generating the encoding signal based on the information. As discussed above, the encoding system may be Morse code, or any other suitable encoding scheme.

In some embodiments processor 510 may be dedicated to performing functions associated with electronic feedback component 120. In other embodiments processor 510 may be configured to perform other functions associated with transaction card 110. For example, processor 510 may perform a card authentication process, cardholder verification process, or transaction authorization process associated with a transaction. Processor 510 may communicate with merchant system 130 and/or financial service provider, for example, through smartcard chip 220. Processor may also be able to communicate via other means, such as wireless communication protocols (e.g., Bluetooth™, NFC, etc.)

Memory (or memories) 520 may include one or more storage devices configured to store instructions to perform operations related to operation of electronic feedback component 120. In some embodiments, memory 520 may further store information to be conveyed to user 101 through electronic feedback component 120. For example, memory 520 may store account information, personal identification information, transaction information, predefined responses and/or queries (e.g., "please insert card", etc.) or the like. Memory 520 may be any form of storage device that may be included on a transaction card, such as a dynamic random access memory (DRAM), a static random access memory (SRAM), a flash memory, an embedded multi-media controller (eMMC), an electrically erasable programmable read-only memory (EEPROM), or the like.

In some embodiments, memory 520 may be associated with other functions of transaction card 110. For example, memory 520 may be configured to store applications, such as Europay Mastercard® Visa® (EMV) applications, that provide instructions for completing a transaction or a cardholder verification process. Memory 520 may comprise other data, such as lifecycle information, intellectual property information, manufacturer information, personalization data (e.g., account numbers, keys, transaction counters, etc.), biometric information (e.g., fingerprint templates, etc.), or the like. In other embodiments, memory 520 may be dedicated to operation of electronic feedback component 120 and, accordingly, transaction card 110 may comprise additional memories for payment and/or transaction functions.

Power source 530 may be any energy storage device configured to supply power to components of transaction card 110. For example, power source 530 may supply power to processor 510, memory 520, and electronic feedback component 120. In some embodiments, power source 530 may be a battery (e.g., a rechargeable lithium-ion battery, an alkaline battery, a nickel-metal hydride battery, a lead-acid battery, etc.). Power source 530 may comprise various other forms of energy storage devices, including a capacitor, a supercapacitor, or the like. In some embodiments, power source 530 may be configured to supply power to other components of transaction card 110 not shown in FIG. 5, such as an EMV chip, etc.

In some embodiments, processor 510 may be configured to receive one or more requests for information and may generate the operation signal based on the request. For example, in some embodiments, processor 510 may receive a request in the form of a transaction being conducted at merchant system 130. For example, processor 510 may be configured to automatically generate operation signals in response to the transaction card being used for the transaction (e.g., at the start of a transaction, or at various points during a transaction). For example, at the outset of a transaction, processor 510 may generate operation signals indicative of a transaction amount, a product or service description, a remaining account balance, a projected remaining account balance, etc. This information may be presented in a particular order (e.g., a default order) that user 101 expects the information to be provided in. Processor 510 may generate additional operation signals at various other points during the transaction (e.g., relating to the status of the transaction, queries for the user, etc.). In some embodiments, processor 510 may generate the operation signals independent of merchant system 130. In other words, merchant system 130 may not be specifically configured to generate prompts associated with activation of electronic feedback component 120. In other embodiments, processor 510 may generate the operation signals based on instructions from merchant system 130 and/or financial service provider system 140. For example, processor 510 may be configured to reproduce information and/or user prompts normally displayed on a card reader device.

Various other triggers or prompts may be used for generating the operation signal by processor 510. For example, in some embodiments, processor 510 may generate the operation signal based on one or more inputs by a user. In some embodiments, user input may be received through electronic device 210. For example, user 101 may manually move tactile element, which may prompt processor 510 to generate the operation signal. In other embodiments, processor 510 may detect contact with tactile element 215 without deliberate movement by the user (e.g., through pressure applied to tactile element 215, slight movements of tactile element 215, heat, disruption of an electromagnetic field, etc.). Processor 510 may be configured to generate operation signals indicative of different information when the information is requested separately from a transaction. For example, processor 510 may generate an operation signal indicative of one or more of an account balance, an account number, etc. As discussed above, the information may be presented in a predetermined order (e.g., a default order). In some embodiments, the information may vary based on the type of input received. For example, moving the tactile element in one direction may indicate a first type of information is requested, whereas moving the tactile element in a different direction may correspond to a different type of information. Various patterns of movement may also be correlated to specific information requests.

In some embodiments, transaction card 110 may include one or more user input devices or sensors (not shown) for requesting information. For example, electronic feedback component 120 and/or transaction card 110 may include a button, a switch, a sensor, or other components for requesting information. In some embodiments, user 101 may request information from transaction card 110 by waving the card (e.g., in a certain pattern, etc.). Accordingly, transaction card 110 may include at least one accelerometer that may provide signals to processor 510 indicative of an information request. Various other forms of input by user 101 may also be used to request information.

In some embodiments, user 101 may customize which information is presented in which scenarios and in which order. For example, user 101 may assign particular operation signals to be generated by processor 510 based on various inputs. For example, user 101 may specify that upon initiating a transaction, processor 510 generate signals indicating the transaction amount and the current account balance in that order. User 101 may also elect to have processor 510 generate an operation signal indicative of the resulting account balance after the transaction has been completed, etc. User 101 may also assign which information is provided based on certain inputs (e.g., waving the card according to a certain pattern, etc.) and in what order.

Such customization may be performed using a graphical user input, which may be displayed on a user device. For example, the user device may be a mobile device, a tablet, a computer, a laptop, a smartwatch, etc. The user device may communicate directly with transaction card 110 (e.g., through a wireless connection, such as Bluetooth™) or indirectly (e.g., through financial service provider 140 while conducting a transaction, etc.). In some embodiments, the various settings associated with transaction card 110 may be stored in memory 520. Various other forms of customization may also be performed by user 101, including which encoding is used, etc.

Figure 6:
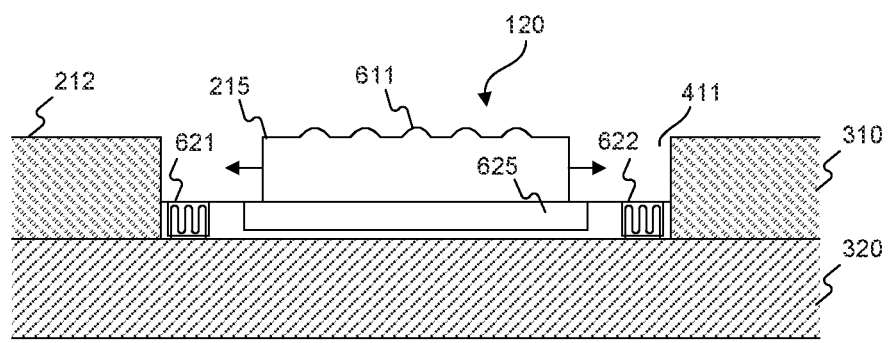
FIG. 6 is a side view of an exemplary electronic feedback component disposed within a transaction card consistent with the disclosed embodiments.

FIG. 6 is a side view of an example electronic feedback component 120 disposed within transaction card 110 consistent with the disclosed embodiments. As described above, electronic feedback component 120 may be disposed within cavity 411 formed in transaction card 110. In some embodiments, cavity 411 may be formed by aperture 311 in front card substrate 310. As discussed above, recess 411 may extend at least partially into rear card substrate 320. Further, at least a portion of electronic feedback component 120 may be disposed between first card substrate 310 and rear card substrate 320. Transaction card 110 may include other layers or substrates in addition to first card substrate 310 and rear card substrate 320.

Various means for actuating electronic feedback component 120 may be provided. In one embodiment, as shown in FIG. 6, electronic feedback component 120 may include one or more magnetic coils 621 and 622. Magnetic coils 621 and 622 may be configured to induce a magnetic field based on a current passing through the coil. Electronic feedback component 120 may include a metallic component 625 that is acted upon by the magnetic field. Accordingly, by applying current to magnetic coil 621 and 622 in alternating patterns, tactile element 215 may move back and forth as indicated by the arrows in FIG. 6. Magnetic coils 621 and 622 may be configured to generate magnetic fields based on an operation signal received by processor 510, as described above. Electronic feedback component 120 may further include support means, such as a track, or other feature for guiding tactile element 215.

Various alternative configurations may be provided. For example, in some embodiments, a single magnetic coil may be provided. By alternating the direction of current, the direction of the magnetic field may be reversed to move tactile element 215 in a bidirectional motion. In other embodiments, magnetic coil 621 may induce a magnetic field to pull tactile element 215 in one direction, and other means may be provided to pull tactile element 215 in the opposing direction when the magnetic field is suspended. For example, instead of magnetic coil 622, electronic feedback component 120 may include a spring, an elastic member, or a similar component for returning tactile element 215 to the opposing direction. Various other means besides magnetic coils may also be provided for actuating tactile element 215 based on an operation signal received from processor 510. For example, in some embodiments, electronic feedback component 120 may include a piezoelectric element or other electromechanical device configured to move tactile element 215 based on an operation signal.

Tactile element 215 may include additional features for improving the tactile interface with user 101. For example, tactile element 215 may comprise a ridge, bump, groove, rough surface, or the like on a surface to be contacted by user 101. As shown in FIG. 6, tactile element 215 may include a plurality of bumps 611 which may increase friction between tactile element 215 and a finger or thumb of user 101. As discussed above, tactile element 215 may be flush with front substrate surface 212 or may be recessed in cavity 411. In some embodiments, at least part of tactile element 215 may protrude beyond front substrate surface 212 (e.g., bumps 611, as shown in FIG. 6).

Figure 7:
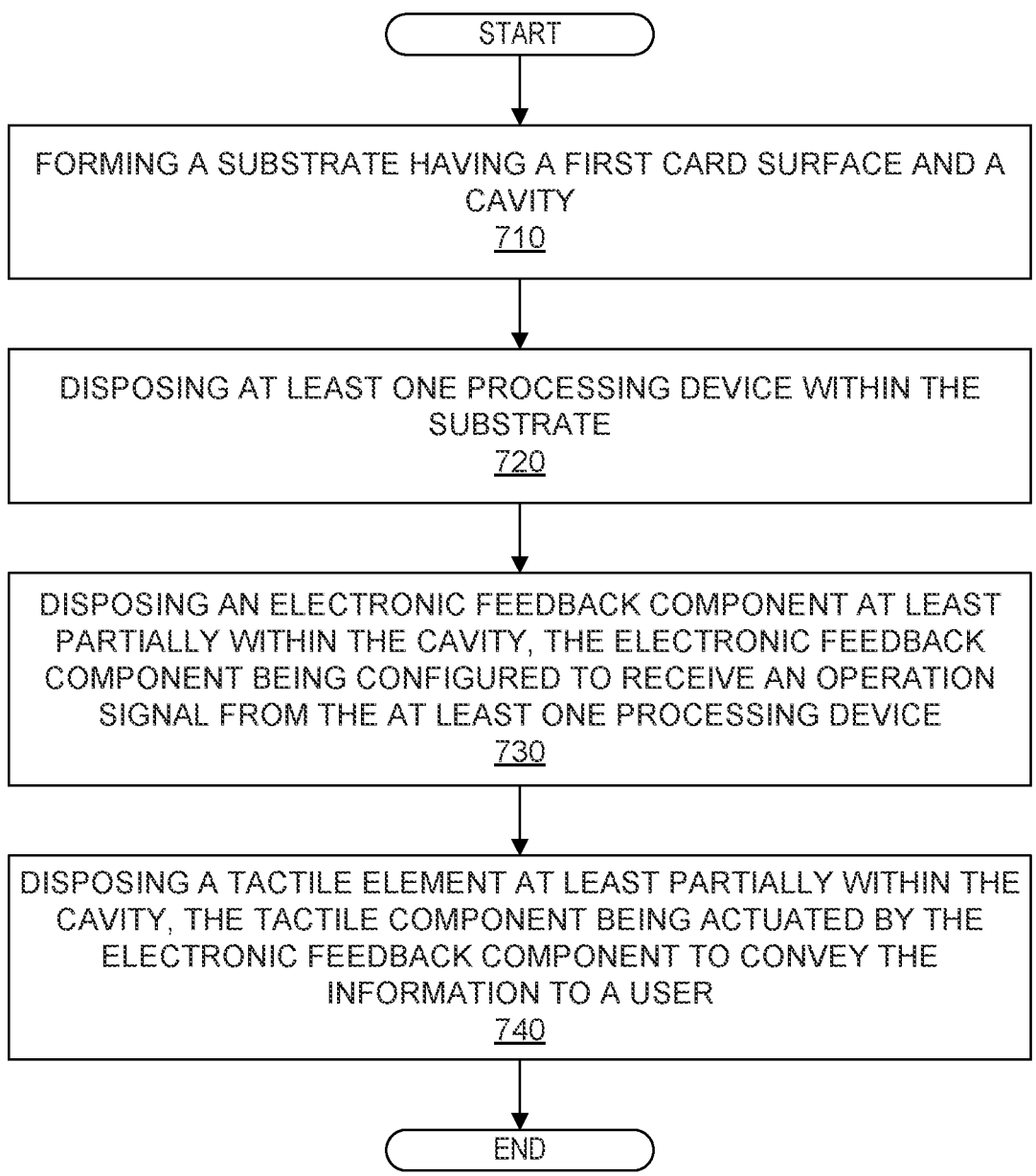
FIG. 7 is a flowchart illustrating an example process for forming a transaction card with an electronic feedback element consistent with the disclosed embodiments.

FIG. 7 is a flowchart illustrating an example process 700 for forming a transaction card with an electronic feedback element consistent with the disclosed embodiments. In step 710, process 700 may include forming a substrate of the transaction card having a first card surface and a cavity. For example, substrate 211, which may have a first card surface 212 and a cavity 411, may be formed in step 710. Substrate 211 may be formed, for example, by a molding process (e.g., injection molding, compression molding, etc.), milling process, stamping process, cutting process, sheet forming process, or combinations thereof.

As described above, substrate 211 may be formed of multiple layers or card substrates. Accordingly, step 710 may further include forming multiple card substrates (e.g., front card substrate 310 and rear card substrate 320) and joining them together. Each card substrate may be formed as described above for substrate 211, for example, by a molding process, milling process, stamping process, cutting process, sheet forming process, or combinations thereof. Front card substrate 310 and rear card substrate 320 (and/or additional card substrates) may be joined by an adhesive (e.g., glue, epoxy, tape, etc.), corresponding attachment features on the card substrates, fasteners, and/or any other type of joining technique or method. In some embodiments, step 710 may include forming one or more apertures (e.g., apertures 311 and 312) within one or more of the substrate layers to form cavity 411.

Accordingly, in some embodiments, substrate component 211 may comprise a first substrate layer (e.g., front card substrate 310) comprising the first substrate surface (e.g., front substrate surface 212) and a second substrate surface opposite the first substrate surface. The first substrate layer may define an aperture (e.g., aperture 311). The substrate component may further comprise a second substrate layer (e.g., rear card substrate 320) having a third substrate surface. The first substrate layer and the second substrate layer may be joined along the second substrate surface and the third substrate surface and a cavity may be defined by the aperture and the third substrate surface.

In step 720, process 700 may include disposing at least one processing device within the substrate. For example, step 720 may include disposing processor 510 within substrate 211. In some embodiments, processor 510 may be included on a chip, such as an EMV chip (e.g., smartcard contact 220) or similar smartcard microchips. Accordingly, step 720 may further comprise disposing memories (e.g., memory 520), secure elements, power sources (e.g., power source 530), or other transaction card components within substrate 211. In embodiments where substrate 211 is formed of multiple layers, processor 510 may be disposed between the one or more layers. Accordingly, processor 510 may be disposed between front card substrate 310 and rear card substrate 320 prior to joining the two substrates together. In some embodiments, processor 510 may be disposed at least partially within an aperture (e.g. aperture 312). Processor 510 (or an associated chip) may be secured using an adhesive (e.g., glue, epoxy, tape, etc.), fasteners, or any other suitable method.

In step 730, process 700 may include disposing an electronic feedback component at least partially within the cavity. The electronic feedback component may be configured to receive an operation signal from the at least one processing device. For example, electronic feedback component 120 may be disposed within cavity 411, as described above. Electronic feedback component 120 may be configured to receive an operating signal from processor 510. As described above, the operating signal may represent information associated with the transaction card based on an encoding scheme (e.g., Morse code). In some embodiments, electronic feedback component 120 may be disposed at least partially between front card substrate 310 and rear card substrate 320. Accordingly, in some embodiments, electronic feedback component 120 may be disposed between front card substrate 310 and rear card substrate 320 prior to joining the substrates together. Electronic feedback component 120 may be secured within cavity 411 using an adhesive (e.g., glue, epoxy, tape, etc.), fasteners, or any other suitable method.

In step 740, process 700 may include disposing a tactile element at least partially within the cavity. The tactile element may be actuated by the electronic feedback component to convey the information to a user. For example, tactile element 215 may be included in electronic feedback component 120 and may be disposed within cavity 411. Tactile element 215 may be actuated based on the operation signal received by electronic feedback component 120 from processor 510 for conveying information to a user (e.g., user 101). Tactile element 215, when actuated by the electronic feedback component, may move bidirectionally along an axis parallel to the first substrate surface. As described above, the tactile element may comprise at least one of a ridge or a bump. Tactile element 215 may be exposed to the user through the cavity such that the information is conveyed to the user through contact with the tactile element. In some embodiments, tactile element 215 may comprise a tactile element surface that is substantially flush with the first substrate surface. In other embodiments, tactile element 215 may comprise a tactile element surface that is below the first substrate surface.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Moreover, while illustrative embodiments have been described herein, the scope includes any and all embodiments having equivalent elements, modifications, omissions, combinations (e.g., of aspects across various embodiments), adaptations or alterations based on the present disclosure. The elements in the claims are to be interpreted broadly based on the language employed in the claims and not limited to examples described in the present specification or during the prosecution of the application, which examples are to be construed as nonexclusive. Further, the steps of the disclosed methods can be modified in any manner, including by reordering steps, combining steps, or inserting or deleting steps.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A device, comprising:
    memory storing computer program instructions and information associated with a transaction card, the information comprising one or more characters; and
    one or more processors that execute the computer program instructions to effectuate operations comprising:
    receiving one or more requests for the information associated with the transaction card;
    generating, responsive to receiving the one or more requests, an operation signal representing the information based on an encoding scheme indicating a predefined pattern or sequence associated with each of the one or more characters; and
    actuating an electronic feedback component based on the operation signal to convey the information to a user such that, in response to being actuated, the electronic feedback component causes a tactile element to move in two or more directions along a surface of the device in the predefined pattern or sequence associated with each of the one or more characters to convey the one or more characters to the user.

2. The device of claim 1, wherein each of the one or more characters is represented as:
    a series of signals having one of two different signal durations, wherein the tactile element is configured to move between two positions to convey each of the one or more characters to the user;
    a series of signals corresponding to a distance traveled by the tactile element, wherein the tactile element is configured to move to different positions to convey the information to the user; or
    a different duration of a vibration.

3. The device of claim 1, wherein the information further comprises biometric information associated with the user.

4. The device of claim 1, wherein the operation signal is generated based on an input provided by the user, the device further comprises:
    one or more accelerometers configured to provide signals to the one or more processors indicative of the information requested by the one or more requests.

5. A device, comprising:
    memory storing computer program instructions and information associated with a transaction card, the information comprising one or more characters; and
    one or more processors that execute the computer program instructions to effectuate operations comprising:
    generating, in response to receiving a request, an operation signal representing the information associated with a transaction card based on an encoding scheme indicating a predefined pattern or sequence associated with each of the one or more characters; and
    actuating an electronic feedback component based on the operation signal to convey the information to a user, wherein in response to being actuated by the electronic feedback component, a tactile element is caused to move in two or more directions along a surface of the device in the predefined pattern or sequence to convey the one or more characters to the user.

6. The device of claim 5, wherein the encoding scheme comprises Morse code.

7. The device of claim 5, wherein the information further comprises information associated with a transaction.

8. The device of claim 5, wherein the information is associated with an account of the user.

9. The device of claim 8, wherein the information comprises an account number of the account, an account balance of the account, or the account number and the account balance.

10. The device of claim 5, wherein each of the one or more characters is represented as a series of signals having one of two different signal durations, wherein the tactile element is configured to move between two positions to convey each of the one or more characters to the user.

11. The device of claim 5, wherein the information further comprises biometric information associated with the user.

12. The device of claim 5, wherein the request is received from a merchant system, a financial service provider, or the merchant system and the financial service provider, and the operation signal is generated based on instructions received from the merchant system, the financial service provider, or the merchant system and the financial service provider.

13. The device of claim 5, wherein the operation signal is generated based on an input provided by the user.

14. The device of claim 13, wherein the information is varied based on a type of input provided.

15. The device of claim 13, further comprising:
one or more input devices or sensors, wherein the input is provided by the user via the one or more input devices or sensors.

16. The device of claim 15, wherein the one or more input devices or sensors comprises one or more accelerometers configured to provide signals to the one or more processors indicative of the information requested by the request.

17. The device of claim 5, wherein each of the one or more characters is represented as a series of signals corresponding to a distance traveled by the tactile element, wherein the tactile element is configured to move to different positions to convey the information to the user.

18. The device of claim 5, wherein each of the one or more characters is represented as a different duration of a vibration.

19. The device of claim 5, wherein the user assigns different operation signals to be generated by the one or more processors based on an input provided.

20. A non-transitory computer-readable medium storing computer program instructions that, when executed by one or more processors, effectuate operations comprising:
generating, in response to receiving a request, based on an encoding scheme, an operation signal representing information associated with a transaction card, wherein the information comprises one or more characters, and wherein the encoding scheme indicates a predefined pattern or sequence associated with each of the one or more characters; and
actuating an electronic feedback component based on the operation signal to convey the information to a user, wherein in response to being actuated by the electronic feedback component, a tactile element is caused to move in two or more directions along a surface of the device in the predefined pattern or sequence to convey the one or more characters to the user.

\* \* \* \* \*